United States Patent
Knox-Holmes et al.

(10) Patent No.: US 9,421,482 B2
(45) Date of Patent: Aug. 23, 2016

(54) METHOD OF STRAINING FLUID

(71) Applicant: Cameron International Corporation, Houston, TX (US)

(72) Inventors: Brent Knox-Holmes, East Farndon (GB); Ian Durdin, Tividale (GB); Andrew David Jackman, Shawell (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 24 days.

(21) Appl. No.: 14/313,760

(22) Filed: Jun. 24, 2014

(65) Prior Publication Data

US 2014/0305885 A1 Oct. 16, 2014

Related U.S. Application Data

(62) Division of application No. 12/091,993, filed on Aug. 27, 2008, now Pat. No. 8,795,528.

(51) Int. Cl.
*B01D 29/68* (2006.01)
*B01D 29/52* (2006.01)

(52) U.S. Cl.
CPC .............. *B01D 29/682* (2013.01); *B01D 29/52* (2013.01); *B01D 2201/0453* (2013.01)

(58) Field of Classification Search
CPC ........................... B01D 29/114; B01D 29/682
See application file for complete search history.

(56) References Cited

U.S. PATENT DOCUMENTS

| | | |
|---|---|---|
| 2,682,812 A | 7/1954 | Mathewson |
| 2,751,034 A | 6/1956 | Ringo et al. |
| 2,954,873 A | 10/1960 | Davis |
| 4,515,127 A | 5/1985 | Katsuoka |
| 4,612,116 A | 9/1986 | Hindman et al. |
| 4,781,825 A | 11/1988 | Grimes et al. |
| 5,030,347 A | 7/1991 | Drori |
| 5,516,426 A | 5/1996 | Hull et al. |
| 5,554,284 A | 9/1996 | Bartlett et al. |
| 5,670,043 A | 9/1997 | Lee |
| 8,795,528 B2 | 8/2014 | Knox-Holmes et al. |

FOREIGN PATENT DOCUMENTS

| | | | |
|---|---|---|---|
| DE | 19523463 A1 | 1/1997 | |
| DE | 19523463 * | 2/1997 | ............ B01D 29/68 |
| EP | 0650753 A2 | 9/1994 | |
| EP | 1254690 A2 | 11/2002 | |

* cited by examiner

*Primary Examiner* — Peter Keyworth
(74) *Attorney, Agent, or Firm* — Mossman Kumar & Tyler PC

(57) ABSTRACT

A strainer system comprises a strainer housing having an inlet for raw fluid and an outlet for strained fluid; a generally cylindrical strainer basket having a strainer screen and disposed within the housing, the external surface of the strainer screen being in flow communication with the raw fluid inlet and the internal surface of the strainer screen being in flow communication with the strained fluid outlet; a backwash collector assembly comprising a backwash conduit having an opening disposed adjacent the outer surface of the strainer screen, the backwash conduit and the strainer basket being moveable relative to each other, so as to allow the opening to pass across the external surface of the strainer screen. A method of straining a fluid, in particular a liquid, is also provided. Finally, a valve assembly for use in the selective opening and closing of a plurality of backwash conduits is disclosed.

9 Claims, 4 Drawing Sheets

METHOD OF STRAINING FLUID

CROSS-REFERENCES TO RELATED APPLICATIONS

This application is a divisional patent application from U.S. patent application Ser. No. 12/091,993 filed Aug. 27, 2008, and which issued Aug. 5, 2014 as U.S. Pat. No. 8,795,528, which claims priority from PCT International Application Number PCT/GB2006/004104 filed Nov. 3, 2006, which claims priority from UK Patent Application No. GB 0522417.5 filed Nov. 3, 2005, all of which are incorporated herein by reference in their entirety.

BACKGROUND OF THE DISCLOSURE

The present invention concerns a strainer assembly and its method of operation. The assembly and method are suitable for use in a wide range of separation operations, in particular, but not limited to, the straining of sea water for use in offshore oil and gas exploration and production operations.

The removal of solid material from water and aqueous streams is required in many processes and operations. One such example is the straining of sea water required, in order to remove solid material including mud, sand, gravel and plant and animal matter, enabling the water to be used in drilling and other operations associated with the exploration and production of oil and gas. Other applications for straining include the cleaning of water produced from subterranean wells, including oil and gas wells, the cleaning and purification of aquifer water, river water and estuary water.

Known strainer assemblies comprise one or more strainer screens extending across a fluid flow path in a vessel or conduit between an inlet for raw fluid and an outlet for strained fluid, the fluid being caused to pass through the screen. In a simple configuration, the strainer screen extends across a pipe or vessel through which the fluid being cleaned is passed. In order to increase the capacity of an assembly, it is known to arrange the strainer material into one or more baskets or candles. One or more such baskets may be arranged within a vessel, to provide a higher surface area of strainer screen per unit volume of the vessel or conduit.

As straining proceeds, solid material is retained on the screen. The accumulation of solid material causes an increase in the pressure drop across the screen, in turn reducing the volume flowrate of fluid through the strainer, leading to reduced straining efficiency. Systems and procedures for removing the solid build up on strainer screens are known and generally comprise reversing the flow of fluid, such that a fluid, often a portion of the strained fluid, is passed through the screen in the opposite direction, removing the solid material. Such a procedure is known in the art as 'backwash'. The strainer system generally comprises a separate conduit and outlet for removing the backwash fluid and the entrained solid debris. In the simple strainer configuration mentioned hereinbefore, the backwash assembly is similarly simple and straightforward. However, when more complex strainer assemblies are employed, the backwash system increases in complexity. This is particularly the case when it is desired to conduct a backwash cycle on a portion of the strainer assembly, while still keeping the remainder of the system available for use.

In one known arrangement, each strainer basket or candle is located in its own conduit, having a fluid inlet and a fluid outlet. Several such conduits are connected by their respective inlets and outlets to a series of fluid headers. In normal operation, raw fluid is feed via a feed header to each strainer candle. Strained fluid is removed via an outlet header. By the operation of appropriate valves, each strainer candle may be isolated from the feed and outlet headers and connected instead to a backwash inlet header and drain header, by means of which a backwash fluid may be passed in reverse direction through the strainer candle to remove solid material and clean the strainer screen. It will be appreciated that such an arrangement is complex in terms of the pipework and valve arrangements required. In addition, the overall assembly occupies a relatively large volume; a disadvantage when the available space is at a premium, for example on a subsea wellhead installation or offshore production platform.

In an alternative known arrangement, a plurality of individual, generally cylindrical strainer candles are mounted in a single vessel. In one particular assembly, the strainer candles extend longitudinally within the vessel between two supporting plates, each plate having an opening in communication with the interior of each strainer candle. An inlet for raw fluid is provided in one end of the vessel, whereby the raw fluid is caused to flow through the respective support plate and into the bore of each candle. Strained fluid is collected from around the candles and leaves the vessel through an appropriate outlet. Solid particles in the raw fluid are retained on the inner surface of the strainer candles.

A backwash system is provided to clean the strainer candles and remove the accumulation of solid material. In its simplest form, the backwash system simply reverses the direction of fluid flow through the vessel and the strainer candles. However, in order for the backwash operation to be completed, the entire vessel must be taken off line.

An improved backwash assembly applies the backwash procedure to one or several strainer candles, while leaving the remaining candles in operation. The system comprises a back wash assembly having one or more rotatable backwash conduits in one end of the vessel. The back wash conduits are brought into cooperation with successive strainer candles and cause fluid to flow along the interior of the candle, removing the accumulated solids by means of a shearing fluid flow. This system is complex to construct and maintain. It relies upon a seal being formed between the backwash conduit and the end of the strainer candle and is prone to leaks and poor backwash efficiency when the seals fail. An improved strainer and backwash system is therefore required.

One such system is the METROL® SEA-SCREEN® Coarse Strainer, commercially available from Petreco International. The system comprises one or more cylindrical strainer baskets arranged within a generally cylindrical vessel. Each strainer basket is provided with a dedicated backwash assembly having an elongate backwash collector head extending the length of the respective strainer basket. The collector head comprises a slot or a plurality of slots adjacent the inner surface of the strainer basket and connected to a backwash conduit in the backwash assembly. In operation, the collector head is rotated within the strainer basket so as to cause the slot to pass across the inner surface of the basket. The backwash conduit is connected to an outlet at reduced pressure, typically by being vented to atmospheric pressure, causing fluid within the vessel to enter the collector head through the slot. Fluid is drawn both through the strainer basket in the reverse direction to normal flow in the region adjacent the collector head, as well as across the inner surface of the strainer basket. In this way, solids accumulated on the inner surface of the strainer basket are removed by a reverse and a shear fluid flow.

While the aforementioned system provides a high straining capability with a very high backwash efficiency, there is a need for still further improvements for some specific applications of the straining concepts. For example, the system requires a motor and gearbox assembly for each strainer basket. While this is generally acceptable, there are circumstances where the overall weight of the strainer unit needs to be reduced. It would also be an advantage if the surface area of straining material per unit volume of the containment vessel could also be increased. This would allow the diameter of the vessel to be decreased for a given straining duty, reducing the size of the unit and further reducing the overall weight of the vessel, both empty and when filled with fluid and in operation.

BRIEF SUMMARY OF THE DISCLOSURE

Surprisingly, it has been found that a most advantageous strainer system can be provided by reversing the direction of fluid flow that is commonly applied in the art and employing the backwash collector arrangement of the METROL® SEA-SCREEN® Coarse Strainer on the exterior of the strainer basket.

Accordingly, in a first aspect, the present invention provides a strainer assembly comprising a strainer housing having an inlet for raw fluid and an outlet for strained fluid;
- a strainer basket having a strainer screen and disposed within the housing, the external surface of the strainer screen being in flow communication with the raw fluid inlet and the internal surface of the strainer screen being in flow communication with the strained fluid outlet;
- a backwash collector assembly comprising a backwash conduit having an opening disposed adjacent the outer surface of the strainer screen, the backwash conduit and the strainer basket being moveable relative to each other, so as to allow the opening to pass across the external surface of the strainer screen.

The strainer assembly of the present invention provides the significant advantage that a high surface area of strainer screen can be contained within a given unit volume of housing, thus reducing the overall size and weight of the complete assembly. Further, the arrangement of the present invention provides for a very high backwash flowrate to be achieved, thus increasing the efficiency of the backwash operation. This in turn reduces the time taken to clean the strainer screen, maximizing the time available for the straining of the liquid.

The strainer assembly of the present invention may be used to strain any suitable liquid. However, the assembly is particularly suitable for the straining of water and aqueous streams. In one specific application, the assembly of the present invention may advantageously be employed in the straining of sea water, in particular sea water for injection into an underground formation during an oil and/or gas production operation.

As noted above, the backwash conduit and the strainer basket are movable with respect to one another. The backwash conduit may be arranged to be movable, with the strainer basket being fixed. However, in a preferred embodiment, the strainer basket is movable, in particular rotatable, with respect to the backwash conduit, whereby successive portions of the outer surface of the strainer screen may be exposed to the opening in the backwash conduit.

The backwash conduit may take any suitable form, providing a channel or conduit for the transport of the backwash liquid and the entrained solids removed from the strainer screen out of the strainer assembly for treatment and/or disposal. Preferably, the backwash conduit is a tube, the opening in the backwash conduit being one or more slits or holes in the tube. The slits or holes may take any suitable form. However, it is preferred that the backwash conduit comprises one or more longitudinal slits. In a particularly advantageous arrangement, the opening in the backwash conduit is a longitudinal slit extending substantially the complete length of the strainer screen.

The strainer assembly of the present invention may comprise a single strainer basket and a single backwash assembly. Alternatively, a plurality of pairs of strainer baskets and backwash conduits may be housed within a single vessel. However, it is an advantage of the present invention that a single backwash conduit can service a plurality of strainer baskets, such that a plurality of strainer baskets is associated with the backwash conduit. In such an arrangement, the backwash conduit preferably comprises an opening for each of the plurality of strainer baskets.

The plurality of strainer baskets may be arranged in any suitable pattern around the backwash conduit. A most effective arrangement is for the plurality of strainer baskets to be arranged radially around the backwash conduit. In this way, the minimum amount of space is occupied by the assembly. As will be discussed in more detail hereinafter, this arrangement also allows a particularly effective drive assembly to be employed to move the backwash conduit and strainer baskets relative to one another.

The number of strainer baskets arranged around the backwash conduit may vary, depending upon the size and configuration of the strainer baskets, the backwash conduit, the housing, and the duty to be performed. In particular, the number of strainer baskets that may be arranged around a single backwash conduit may range from 2 to 10. It has been found that an arrangement comprising from 2 to 5 strainer baskets is particularly advantageous, with 3 strainer baskets arranged radially around one backwash conduit being a preferred arrangement.

The arrangement of having a plurality of strainer baskets arranged around a single backwash conduit allows for the present invention to be applied in a modular approach. Accordingly, a strainer system may be envisaged comprising a plurality of strainer modules, each module comprising a backwash conduit and at least one strainer basket associated with the backwash conduit. A single vessel may house 2 or more such modules. Preferably, each module comprises a plurality of strainer baskets associated with each backwash conduit.

A further advantage of the strainer modules of the present invention is that a single drive system can be arranged for moving each of the backwash conduits with respect to its associated strainer baskets. In particular, a preferred assembly comprises a single drive system for moving all of the strainer baskets relative to their associated backwash conduit.

In addition, the present invention allows for a simplified system of valves in the backwash assembly, in order to perform the backwash operation on each strainer basket. In particular, in the modular arrangement discussed hereinbefore, the assembly may comprise a valve assembly for selectively opening each of the backwash conduits to initiate a backwash operation for the strainer baskets associated with that backwash conduit. Details of a preferred valve assembly are given hereinafter.

The opening in the backwash assembly may be arranged to be very close to the outer surface of the strainer screen of the respective strainer basket. In this way, during the backwash cycle, liquid is drawn in the reverse direction through the strainer screen, thereby removing the solids trapped on the outer surface. However, in a preferred arrangement, the opening in the backwash conduit is disposed at a distance from the external surface of the strainer basket that, during a backwash operation, liquid is drawn both through the strainer screen from within the strainer basket and from outside the strainer basket across the external surface of the strainer screen. This combination of both through-flow and cross-flow liquid provides a higher cleaning efficiency during the backwash cycle, improving the straining capacity of the assembly and shortening the backwash time. The opening in the backwash conduit is preferably disposed such that, during a backwash operation, the ratio of the liquid flow across the strainer screen to the liquid flow through the strainer screen is from 3:1 to 1:3, more preferably 2:1. To achieve this, the opening in the backwash conduit is preferably at a distance of from 0.5 to 10.0 mm from the external surface of the strainer screen, more particularly from 0.75 to 3.0 mm from the external surface of the strainer screen, depending upon the size of the solid particles in the inlet liquid stream.

The size of the opening in the backwash conduit may be selected to provide the required backwash performance, which will depend in part upon the duty being performed. Preferably, the area of the opening in the backwash conduit is from 0.1 to 10% of the surface area of the strainer screen, more preferably from 0.1 to 4% of the surface area of the strainer screen.

It is preferred that the backwash conduit obscures only a minor portion of the strainer screen, thus allowing the major portion of the screen to operate fully in the straining of liquid. Preferably, the backwash conduit obscures less than 10% of the exterior surface of the strainer screen.

The strainer assembly may be arranged such that the straining function is stopped for a particular strainer basket while the backwash operation is being conducted. Preferably, however, the backwash conduit is arranged such that, during the backwash operation, the portion of the strainer screen away from the opening in the backwash conduit remains operative in the straining operation. The ability to carry out the backwash and straining operations simultaneously using a given strainer basket is a particular advantage of the present invention.

In a further aspect, the present invention provides a method of straining a liquid comprising:
  causing the liquid to pass from the outside of a strainer basket through a strainer screen to the inside of the strainer basket;
  causing a backwash conduit having an opening disposed adjacent the outer surface of the strainer screen to move relative to the outer surface of the strainer screen, whereby the portion of the strainer screen adjacent the opening in the backwash conduit is subjected to a backwash operation.

As noted above, the straining operation and the backwash operation may be carried out successively on a given strainer basket. However, preferably, the straining and backwash operations are continued concurrently for a given strainer basket.

The backwash operation preferably comprises liquid flowing from inside the strainer basket through the strainer screen and into the opening in the backwash conduit and liquid flowing from adjacent the outside of the strainer basket across the strainer screen, as discussed above. Preferably, the ratio of the flow of liquid through the strainer screen and into the opening in the backwash conduit and the flow of liquid across the strainer screen into the opening in the backwash conduit is from 3:1 to 1:3, more preferably 1:2.

The backwash conduit may be moved relative to the strainer screen of the strainer basket, which may also move or be stationary. However, it is preferred that the backwash conduit is stationary and the strainer screen is moved relative to the opening in the backwash conduit.

Most advantageously, a plurality of strainer baskets is associated with the backwash conduit. Preferably, the backwash conduit comprises an opening for each of the plurality of strainer baskets.

The area of the opening in the backwash conduit is from 0.1 to 10% of the surface area of the strainer screen, more preferably from 0.1 to 4% of the surface area of the strainer screen.

As noted above, the concept underlying the present invention allows for a plurality of separate strainer baskets to be arranged and associated with a single backwash conduit. Accordingly, in a further aspect, the present invention provides a strainer system comprising:
  a strainer housing having an inlet for raw fluid and an outlet for strained fluid;
  a plurality of strainer baskets disposed within the housing, one of the internal and external surfaces of the strainer basket being in flow communication with the raw fluid inlet and the other of the internal and external surfaces of the strainer basket being in flow communication with the strained fluid outlet;
  a backwash collector assembly comprising a backwash conduit operable to conduct a backwash operation on the plurality of strainer baskets.

Most advantageously, the backwash collector assembly is arranged to conduct a backwash operation on the plurality of strainer baskets simultaneously.

In still a further aspect, the present invention provides a method of straining a fluid comprising:
  causing the fluid to pass from the outside of each of a plurality of strainer baskets through a strainer screen to the inside of each strainer basket;
  causing a backwash conduit having an opening to move relative to the outer surface of each strainer screen, whereby the portion of the strainer screen adjacent the opening in the backwash conduit is subjected to a backwash operation.

The plurality of strainer baskets are preferably subjected to a backwash operation simultaneously.

Finally, as noted above, the present invention advantageously allows a plurality of separate strainer modules, each comprising one or more strainer baskets, to be serviced by a single drive system, in particular a single drive motor, and a single backwash system. In this respect, the present invention also provides, in a further aspect, a valve assembly for use in the backwash assembly of a strainer or filtration assembly, the backwash assembly comprising a plurality of backwash conduits each having an outlet opening, the valve assembly comprising a valve plate having an opening therein, the valve plate being moveable to bring the opening into alignment with the outlet opening of a backwash conduit to thereby connect the backwash conduit with an outlet conduit.

The valve plate is preferably rotatable, rotation of the valve plate causing the opening therein to move into and out of alignment with successive backwash conduits. In a preferred arrangement, the opening is an arcuate opening. This allows the opening to be formed in the valve plate such that the length of the arc of the opening determines the length of time that the valve is open. For operation of the strainer assembly of the present invention, the opening preferably extends through an arc of from 10 to 30°, more preferably from 15 to 25°. The opening may be sized so that a single backwash conduit is opened at any time. Alternatively, the opening may be sized to allow two or more backwash conduits to be opened.

While the valve may be arranged such that there are periods when no backwash conduits are open, the resulting hydraulic clamping force may make rotation of the valve plate difficult.

This is particularly the case where the motor driving the valve plate has insufficient torque to overcome the hydraulic clamping force. In such cases, it is preferred that the valve plate and opening are arranged so that there is always at least one backwash conduit at least partially open at any given time or position in operation.

While the valve assembly of the present invention has been disclosed in conjunction with the backwash system of a strainer or filtration assembly, it will be understood that the principles of the valve assembly may be applied to the opening and closing of any range of openings, tubes or conduits, as need may dictate.

BRIEF DESCRIPTION OF THE DRAWING

Embodiments of the present invention will now be described, by way of example only, having reference to the accompanying drawings, in which.

DETAILED DESCRIPTION OF THE DISCLOSURE

Figure 1:
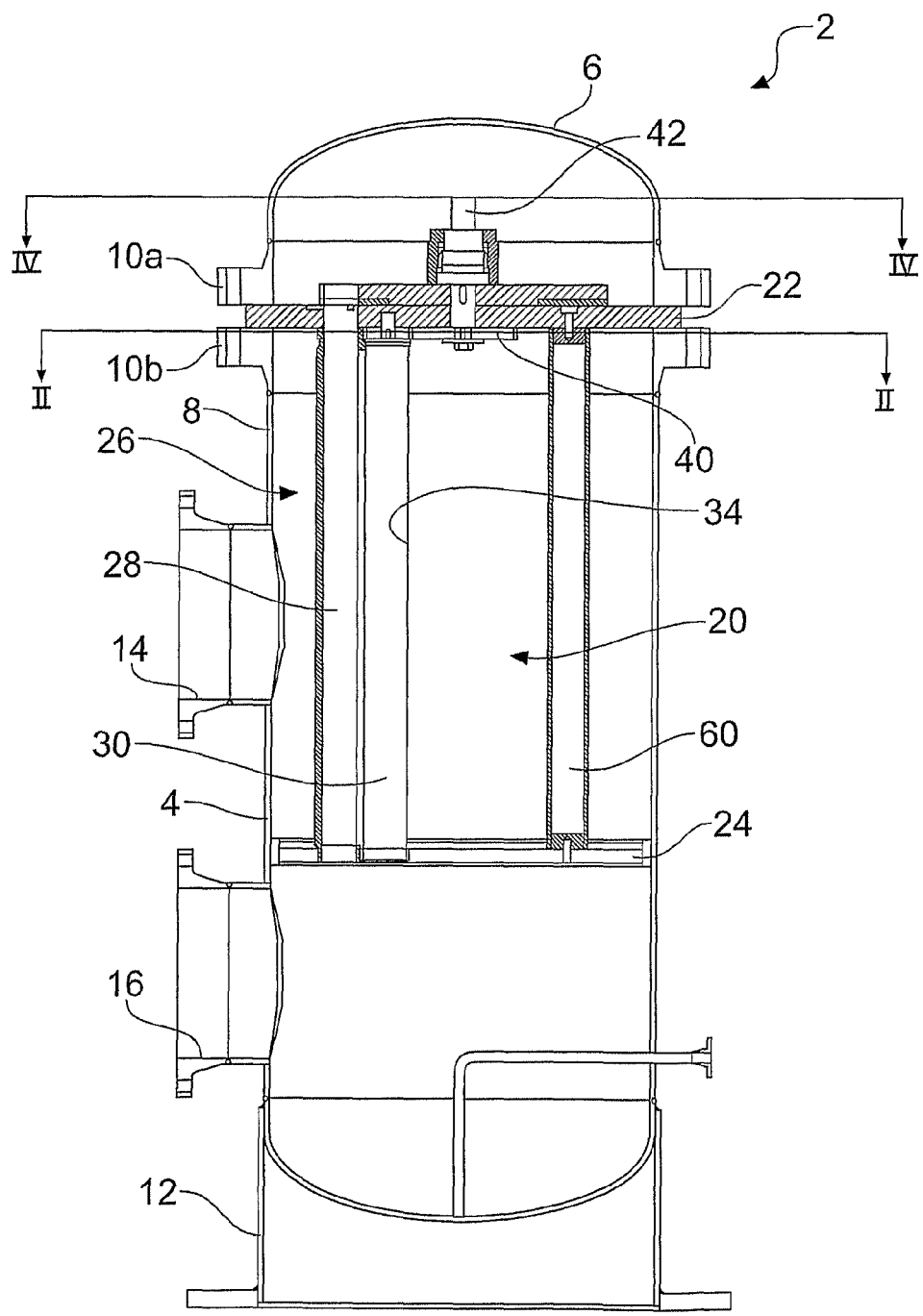
FIG. 1 is a longitudinal cross-sectional view through a strainer assembly according to one embodiment of the present invention.

Referring to FIG. 1, there is shown a strainer assembly, generally indicated as 2, comprising a housing 4 in the form of a generally upright, cylindrical vessel of conventional design and construction. While the embodiment shown in the figures and discussed hereinafter is arranged essentially vertically, it will be appreciated that the assembly may be oriented in other positions, for example horizontally, as need dictates.

The housing has an upper domed end 6 secured to the central body 8 of the housing 4 by way of flanges 10a and 10b. The assembly 2 is supported on a base 12, allowing the assembly to be secured at any suitable location. The housing 4 is provided with an inlet 14 for liquid to be strained and an outlet 16 for strained liquid.

Figure 2:
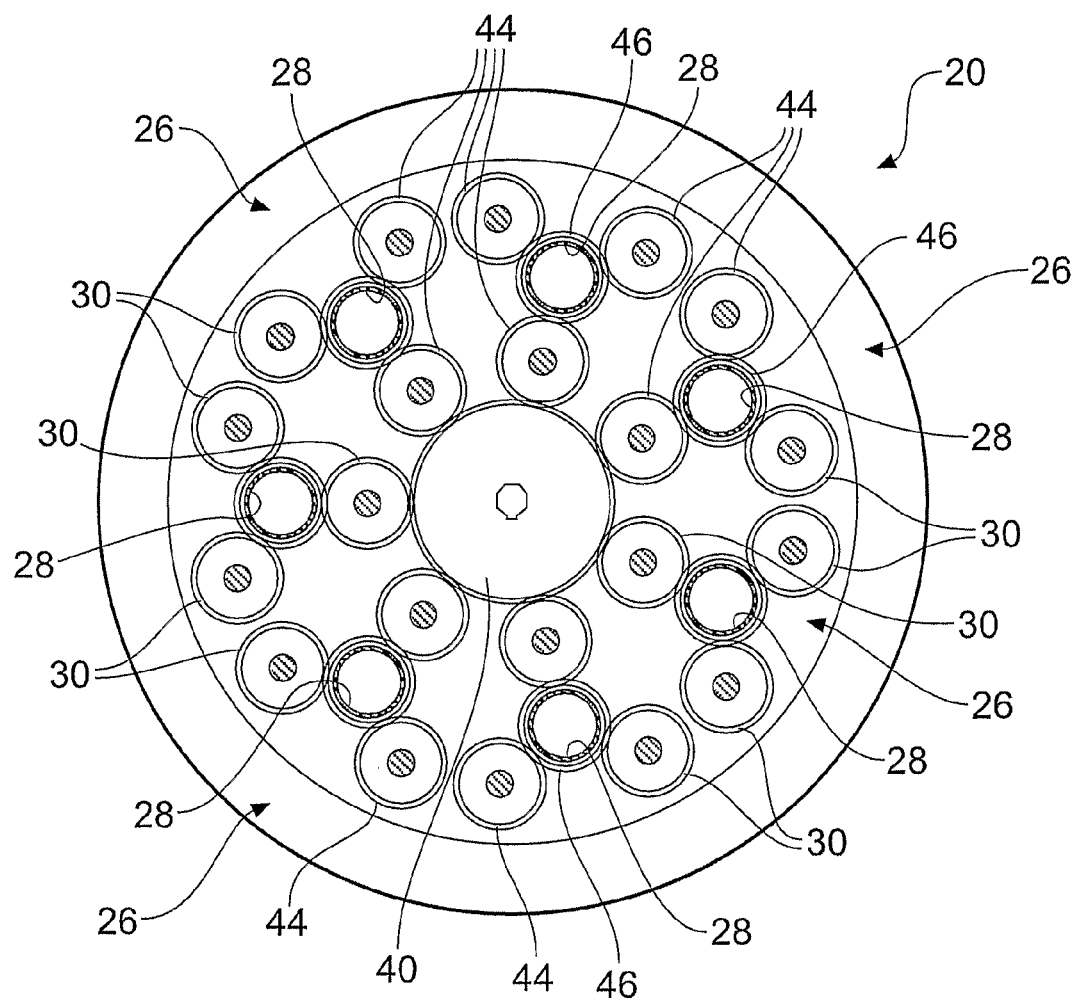
FIG. 2 is a cross-sectional view of the assembly of FIG. 1 along the line II-II.
Figure 3:
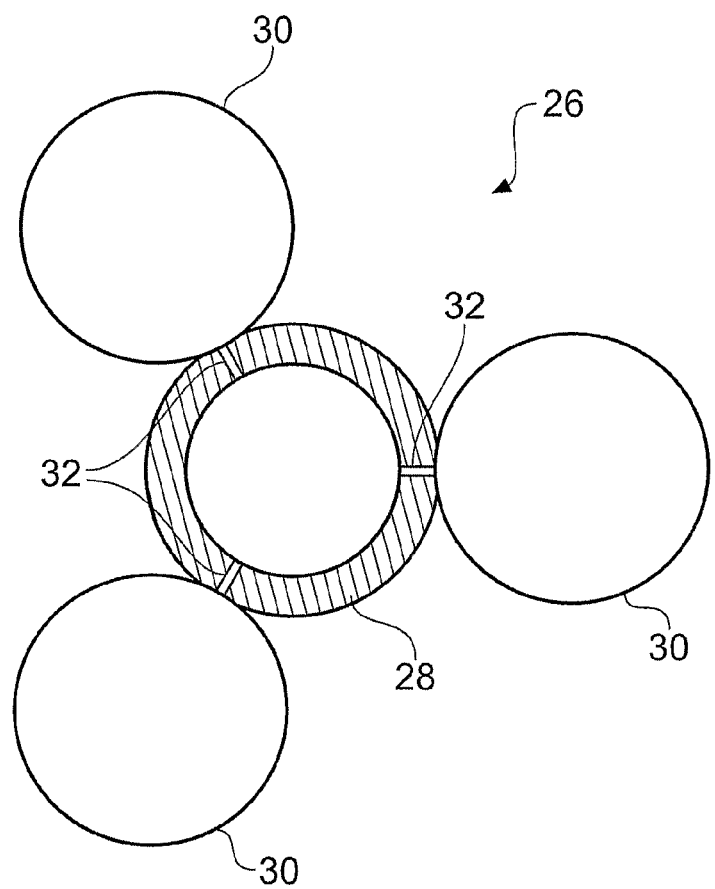
FIG. 3 is a simplified representation of the arrangement of strainer baskets and backwash conduit according to a preferred embodiment of the present invention.

A strainer assembly, generally indicated as 20, is retained within the housing 4 between and upper plate 22 and a lower plate 24. The upper plate 22 is retained by being sandwiched between the flanges 10a and 10b on the end 6 and body 8 of the housing 4. Suitable gaskets (not shown) are used to ensure a liquid-tight seal between the components and the flanges. As shown more clearly in FIG. 2, the strainer assembly 20 comprises a plurality of strainer modules 26, each strainer module comprising a central backwash tube 28 and three strainer baskets 30. As shown in FIG. 2, the arrangement shown in the figures comprises a total of seven strainer modules 26. A single backwash tube 28 and a single strainer basket 30 are shown in FIG. 1, purely for reasons of clarity.

Each strainer module 26 is arranged substantially vertically within body 8 of the housing 4. Each backwash tube 28 extends upwards from the lower plate 24, the lower end of the backwash tube 28 being closed by the lower plate. At its upper end, the backwash tube 28 extends through the upper plate 22 and opens in the cavity in the upper end 6 of the housing 4 above the upper plate.

Each backwash tube 28 is provided with a longitudinal slit 32 extending along its length at the point facing each of the strainer baskets 30 associated with the backwash tube. This arrangement is shown in stylized form in FIG. 4. As an alternative to the slit 32, the backwash tube may be provided with a series of holes. A flow path for backwash liquid is thus formed extending from the region of the housing 4 surrounding the strainer baskets 30, through the slits 32 in each backwash tube 28 and into the upper cavity of the housing 4. An outlet (not shown for reasons of clarity) for the backwash liquid is provided in the upper portion of the housing 4.

Each strainer basket 30 extends between the upper plate 22 and the lower plate 24. At its upper end, each strainer basket 30 is closed and sealed at its upper end adjacent the upper plate 22. At its lower end, each strainer basket 30 extends through and opens into the cavity below the lower plate 24. Each strainer basket 30 comprises a generally cylindrical strainer screen 34 extending substantially the entire length of the strainer basket 30 between the upper plate 22 and the lower plate 24. A straining flow path for liquid is thus formed extending from the inlet 14 and the cavity within the central portion 8 of the housing 4, through the strainer screen 34, downwards along the interior of the strainer basket 30 and into the lower cavity in the housing 4 below the lower plate 24. The outlet 16 is provided to remove strained liquid from the housing 4.

In the arrangement shown in the figures, each backwash tube 28 and its associated strainer baskets 30 are movable with respect to one another by having the strainer baskets 30 rotatable. The drive assembly for rotating the strainer baskets 30 is shown in FIG. 1 and in detail in FIG. 2. A central drive gear 40 is provided, mounted on a central drive shaft 42 extending through the upper plate 22 and driven by a motor assembly (not shown for clarity). It is a particular advantage of the embodiment shown in the figures that all the strainer baskets are driven from a single motor assembly.

Each strainer basket 30 is provided with a fixed gear 44 at its upper end adjacent the upper plate 22. The fixed gear 44 on each strainer basket 30 is fixed in its relationship with the strainer basket, such that rotation of the gear 44 causes the entire strainer basket to rotate. Each backwash tube 28 is provided with an idler gear 46 at its upper end adjacent the upper plate 22. The idler gear 46 is free to rotate about the backwash tube 28, without causing rotation of the backwash tube. The idler gear 46 of each backwash tube 28 engages with the fixed gear 44 on each of the associated strainer baskets 30. The innermost strainer basket 30, that is the basket disposed closest to the central axis of the housing 4, of each module has its fixed gear 44 engaged with the central drive gear 40.

In operation, rotation of the central drive gear 40 causes rotation of the innermost strainer basket 28 of each module, which in turn drive the remaining strainer baskets by means of the idler gear 46 on each backwash tube 28.

Figure 4:
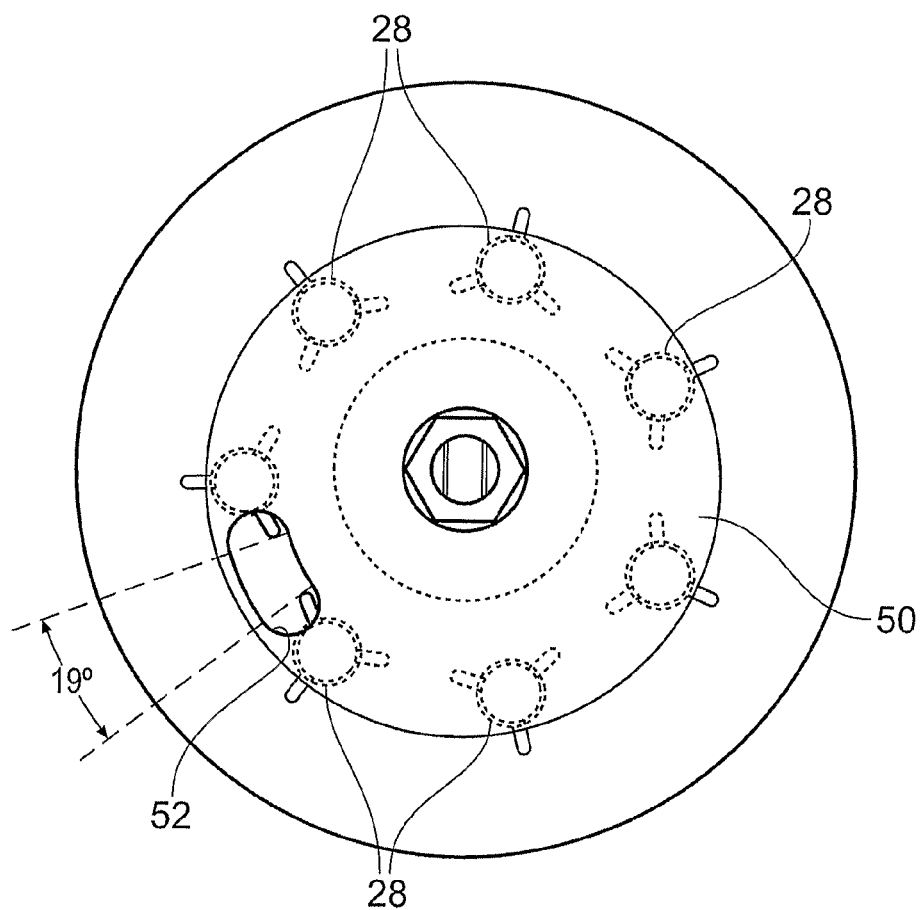
FIG. 4 is a cross-sectional view of the assembly of FIG. 1 along the line IV-IV showing the valve assembly of the present invention.

In order to operate the backwash function to clean the strainer screen on each strainer basket, the assembly 2 is provided with a valve assembly. The valve assembly comprises a circular valve plate 50, shown in detail in FIG. 4. The valve plate 50 is mounted for rotation on the upper surface of the upper plate 22, as shown in FIG. 1. A backwash drive assembly (not shown for clarity) is provided to rotate the valve plate 50. The valve plate 50 is provided with an elongate arcuate opening 52, positioned such that rotation of the valve plate 50 causes the opening 52 to pass over the open end of each backwash tube 28 in turn. The length of the arcuate opening 52 determines the length of time that each backwash tube 28 is opened, which in turn determines the length of the backwash operation applied to each strainer module. With the width in the radial direction of the arcuate opening set as the same as the internal diameter of each backwash tube, the length of time that each backwash tube is open is proportional to the arc of the opening, for a given speed of rotation of the valve plate. This is preferably from 10 to 30°. As shown in FIG. 4, the opening extends through an arc of 19°.

In order to provide support and rigidity to the internal structure of the strainer assembly, tie bars 60 extend within the housing 4 between and are bolted to the upper plate 22 and the lower plate 24. The tie bars are shown in FIG. 1, but have been omitted from the remaining figures for reasons of clarity.

In operation, a liquid to be strained, such as seawater, is fed to the inlet 14 of the housing 4, from where it enters the central cavity of the assembly. The liquid passes through the strainer screen 34 of each strainer basket 30, the action of which is to leave any entrained solids on the outer surface of the strainer screen 34. The strained liquid flows along the strainer basket 30 and into the cavity below the lower plate 24, from where it leaves the assembly through the outlet 16.

After a period of operation, the differential pressure across the strainer screens will increase, due to the build up of solid material and debris. At a predetermined pressure drop, the backwash operation is initialized.

The backwash operation is commenced by starting the drive assembly to rotate the strainer baskets 30 by means of the central drive gear 40. The action of this is to cause the entire outer surface of each strainer screen 34 to pass across the respective slit or hole 32 in the associated backwash tube 28. At the same time, the valve plate 50 is rotated, causing the arcuate opening 52 to pass into and out of alignment with the upper end of each backwash tube 28 in turn. As the opening 52 passes over a backwash tube 28, the interior of the tube is vented to the pressure in the domed end 6 of the housing, which is typically ambient or atmospheric pressure. This establishes a significant pressure differential between the liquid in the central cavity of the housing and the outlet of the opened backwash tube 28, the effect of which is twofold. First, liquid is drawn through the strainer screen 34 in the reverse direction of normal flow, that is from inside the strainer basket 30 to the outside and into the slit 32 in the backwash tube 28. Second, liquid surrounding the strainer screen is caused to flow across the outer surface of the strainer screen and into the slit 32 in the backwash tube. Thus, a dual-flow backwash system is established.

The portion of the strainer screen 34 that is exposed to the slit in the backwash tube 28 and the backwash flow is just a fraction of the total surface are of the strainer screen. Typically, this is from 0.1 to 10% of the total surface area. In this way, a very high rate of backwash flow is generated, leading to a very high cleaning efficiency of the screen. Typically, backwash flow velocities of 2 m/s and higher can be achieved and maintained.

As the opening 52 in the valve plate 50 moves out of alignment with the first backwash tube 28, the backwash operation for that strainer module will cease. The next strainer module in the direction of rotation of the valve plate 50 will begin its backwash cycle once the opening 52 in the valve plate 50 comes into alignment with the backwash tube 28. In the arrangement shown in the accompanying figures, the valve plate 50 is provided with a single opening 52 of such a size that only one backwash tube 28 can be open at any given time. In this way, only one module undergoes backwash at a time. If desired, more than one opening 52 may be provided in the valve plate 50 or the opening may be larger, such that more than one strainer module may undergo backwash at the same time.

It is a feature of the strainer assembly of this invention that straining continues while individual strainer modules are undergoing a backwash. Indeed, a given strainer basket may be having a portion of its strainer screen being cleaned by the backwash cycle discussed above, leaving the remaining area of the screen available for straining.

The length of time of operation of the backwash system will be determined by the operating circumstances, in particular the concentration of solid material in the liquid being strained. Once the pressure differential across the strainer screens is reduced to normal operating levels, the backwash operation is stopped and normal operation is continued. In such a case, it is envisaged that the backwash system will operate intermittently. However, the strainer assembly of the present invention is flexible in its operation, such that heavily polluted liquids containing a high solids content may be strained and the backwash system operated continuously.

The method and apparatus of the present invention, in their various aspects, have been disclosed and described with reference to the straining of fluids, in particular liquids. In this respect, straining is to be understood as a surface effect, providing nominal separation between solids and the fluids in which they are entrained, for example 98% removal of all particles greater than 100 μm. It will be understood that the various aspects of the invention may also be applied in other fluid-solid separation processes, such as filtration, including depth filtration and the like.

The present invention has been particularly described in relation to the separation of solids from a liquid. However, the principles of the present invention in its various aspects may also be applied to the removal of solids from fluids in general, including gaseous streams.

What is claimed is:

1. A method of straining a fluid comprising:
    causing a fluid to pass from an outside of a strainer basket through a strainer screen to an inside of the strainer basket;
    causing a backwash conduit having an opening disposed adjacent the outer surface of the strainer screen to move relative to the outer surface of the strainer screen, whereby a portion of the strainer screen adjacent the opening in the backwash conduit is subjected to a backwash operation,
    where the method employs a strainer system comprising:
    a strainer housing having an inlet for raw fluid and an outlet for strained fluid;
    the strainer basket having the strainer screen and disposed within the housing, an external surface of the strainer screen being in flow communication with the raw fluid inlet and an internal surface of the strainer screen being in flow communication with the strained fluid outlet;
    a backwash collector assembly comprising the backwash conduit having the opening disposed adjacent the outer surface of the strainer screen, the backwash conduit and the strainer basket being moveable relative to each other, so as to allow the opening to pass across the outer surface of the strainer screen;
    a plurality of strainer modules, each module comprising a backwash conduit and at least one strainer basket associated with the backwash conduit; and
    a valve assembly for selectively opening each of the backwash conduits to initiate a backwash operation for the strainer baskets associated with that backwash conduit, wherein the valve assembly comprises a valve plate having a single valve plate opening therein, the valve plate being moveable to bring the single valve plate opening into alignment with an outlet opening of a backwash conduit to thereby directly connect the backwash conduit with a single outlet conduit.

2. The method according to claim 1, wherein the backwash operation comprises fluid flowing from inside the strainer basket through the strainer screen and into the opening in the backwash conduit and fluid flowing from adjacent the outside of the strainer basket across the strainer screen.

3. The method according to claim 1, wherein the backwash conduit is stationary and the strainer screen is moved relative to the opening in the backwash conduit.

4. The method according to claim 1, wherein a plurality of strainer baskets are associated with the backwash conduit.

5. The method according to claim 4, wherein the backwash conduit comprises an opening for each of the plurality of strainer baskets.

6. The method according to claim 1, wherein the ratio of the flow of fluid through the strainer screen and into the opening in the backwash conduit and the flow of fluid across the strainer screen into the opening in the backwash conduit is from 3:1 to 1:3.

7. The method according to claim 1, wherein the area of the opening in the backwash conduit is from 1 to 10% of the surface area of the strainer screen.

8. The method according to claim 1, wherein the portion of the strainer screen not adjacent the opening in the backwash conduit operates to strain fluid passing through the strainer screen from outside the strainer basket to the inside of the strainer basket.

9. The method according to claim 1 wherein the backwash conduit is cylindrical.

\* \* \* \* \*